US010564441B2

(12) United States Patent
Psaila et al.

(10) Patent No.: US 10,564,441 B2
(45) Date of Patent: Feb. 18, 2020

(54) METHOD OF FORMING AN OPTICAL DEVICE BY LASER SCANNING

(75) Inventors: Nicholas D Psaila, Broxburn (GB); Ajoy Kumar Kar, Edinburgh (GB); Henry Thomas Gibson Bookey, Stirling (GB); Robert R Thomson, Edinburgh (GB); Graeme Brown, Fauldhouse (GB)

(73) Assignee: Optoscribe Limited, Livingston (GB)

( * ) Notice: Subject to any disclaimer, the term of this patent is extended or adjusted under 35 U.S.C. 154(b) by 1091 days.

(21) Appl. No.: 13/703,463

(22) PCT Filed: Jun. 10, 2011

(86) PCT No.: PCT/GB2011/000869
§ 371 (c)(1),
(2), (4) Date: Mar. 27, 2013

(87) PCT Pub. No.: WO2011/154701
PCT Pub. Date: Dec. 15, 2011

(65) Prior Publication Data
US 2013/0208358 A1  Aug. 15, 2013

(30) Foreign Application Priority Data
Jun. 11, 2010  (GB) .................................. 1009810.1

(51) Int. Cl.
*G02B 27/42* (2006.01)
*G02B 5/18* (2006.01)
*G02B 6/12* (2006.01)

(52) U.S. Cl.
CPC ........... *G02B 27/42* (2013.01); *G02B 5/1857* (2013.01); *G02B 6/12002* (2013.01); *G02B 2006/12107* (2013.01); *G02B 2006/12169* (2013.01)

(58) Field of Classification Search
CPC ... G02B 27/42; G02B 5/1857; G02B 6/12002
See application file for complete search history.

(56) References Cited

U.S. PATENT DOCUMENTS 6,552,301 B2  4/2003  Herman et al.
7,294,454 B1  11/2007  Said et al.
(Continued)

FOREIGN PATENT DOCUMENTS

WO    03046625 A1    6/2006
WO    2007134438 A1  11/2007
WO    2008155548 A1  12/2008

OTHER PUBLICATIONS

Zhang et al, Three-dimensional optical sensing network written in fused silica glass with femtosecond laser, Optics Express, Sep. 1, 2008, pp. 14015-14023, vol. 16, No. 18.
(Continued)

*Primary Examiner* — Mathieu D Vargot
(74) *Attorney, Agent, or Firm* — Womble Bond Dickinson (US) LLP

(57) ABSTRACT

A method of forming an optical device in a body (32), comprises performing a plurality of laser scans (34,36) to form the optical device, each scan comprising relative movement of a laser beam and the body thereby to scan the laser beam along a respective path (34*a*, 34*b* 34*f*; 36*a*, 36*b* 36*f*) through the body to alter the refractive index of material of that path, wherein the paths are arranged to provide in combination a route for propagation of light through the optical device in operation that is larger in a direction substantially perpendicular to the route for propagation of light than any one of the paths individually.

12 Claims, 10 Drawing Sheets

(56) References Cited

U.S. PATENT DOCUMENTS

| 2002/0076655 | A1 | 6/2002 | Borrelli et al. | |
|---|---|---|---|---|
| 2004/0161709 | A1 | 8/2004 | Schroeder et al. | |
| 2006/0191884 | A1* | 8/2006 | Johnson | B23K 26/04 219/121.85 |
| 2006/0219676 | A1 | 10/2006 | Taylor et al. | |
| 2009/0263072 | A1 | 10/2009 | Albert et al. | |
| 2012/0039567 | A1 | 2/2012 | Herman et al. | |

OTHER PUBLICATIONS

Zhang et al, Forward and backward grating-assisted directional couplers in silicon for wavelength-division multiplexing tunable add-drop applications, Optical Engineering, May 2006, pp. 054603-1-054603-5, vol. 45(5).

Dong et al, Add/drop channel filter based on two parallel long-period fiber gratings coupler, Optik Optics, 2009, pp. 855-859, 120, Elsevier GmbH.

Maselli et al, Femtosecond laser written optofluidic sensor: Bragg grating waveguide evanescent probing of microfluidic channel, Optics Express, Jul. 6, 2009, pp. 11719-11729, vol. 17, No. 14.

Eaton et al, Telecom-band Directional Coupler Written With Femtosecond Fiber Laser, IEEE Photonics Technology Letters, Oct. 15, 2006, pp. 2174-2176, vol. 18, No. 20.

Marshall et al, Directly written monolithic waveguide laser incorporating a distributed feedback waveguide-Bragg grating, Optics Letters, May 1, 2008, pp. 956-958, vol. 33, No. 9, Optical Society of America.

Marshall et al, Direct laser written waveguide-Bragg gratings in bulk fused silica, Optics Letters, Sep. 15, 2006, pp. 2690-2691, vol. 31, No. 18, Optical Society of America.

Zhang et al, Type II high-strength Bragg grating waveguides photowritten with ultrashort laser pulses, Optics Express, Apr. 2, 2007, pp. 4182-4191, vol. 15, No. 7.

Jáuregui et al, Interrogation of fibre Bragg gratings with a tilted fibre Bragg grating, Meas. Sci. Technol., 2004, pp. 1596-1600, vol. 15, Institute of Physics Publishing Ltd, United Kingdom.

Zhang et al, Bragg Grating Waveguides: Extending Bragg Technology into Three Dimensions, photonics.com, Jan. 1, 2008, pp. 1-6, <http://www.photonics.com/Article.aspx?AID=31911>.

Zhang et al, Single-step writing of Bragg grating waveguides in fused silica with an externally modulated femtosecond fiber laser, Optics Letters, Sep. 1, 2007, pp. 2559-2561, vol. 32, No. 17, Optical Society of America.

Kamata et al, Waveguide based Bragg filters inside bulk glasses integrated by femtosecond laser processing, 2005 Conference on Lasers and Electro-Optics Europe, p. 492.

European Examination Report dated Jul. 11, 2017 for Application No. 11731460.9.

Examination Report from corresponding European Patent Appl. No. 11731460.9, dated Jan. 31, 2019.

* cited by examiner

METHOD OF FORMING AN OPTICAL DEVICE BY LASER SCANNING

FIELD OF THE INVENTION

The present invention relates to methods and apparatus for forming waveguide and other optical devices, and to such waveguides and other optical devices.

BACKGROUND

Within a fibre optic cable such as that used in optical communications, visible light signals travel along the cable bounded by multiple glass layers with different refractive index properties; through a process known as total internal reflection these layers trap the light in the fibre core so it cannot escape until it reaches the end of the cable where it can be collected/analysed.

It is well known to include fibre optic cables in an optical sensing network by interfacing them to optical sensors to detect, for example, stress/strain, temperature, humidity, pressure or other properties. Many of these optical sensors use components called fibre Bragg gratings (FBGs). A Bragg grating is a periodic refractive index variation that will reflect light only at a precise colour or wavelength—known as the Bragg wavelength. When these structures are present in optical fibres they are known as FBGs and the precise wavelength of the back reflected light will depend on the environment local to the FBG. This concept is now routinely exploited to create distributed sensing networks for many applications.

A key component of such systems is the interrogator. This is the device that measures the wavelength shift and produces the calibrated signal that provides the measure of temperature/stress/strain or other property of the system under test. This is where the main cost of a system lies. The interrogator system itself is a precision optical analyser comprising fibre connectors, mirrors, optics and detectors that is bulky (often shoe box sized), expensive to build, can be easily damaged and is a major barrier to mass market uptake.

It is known to form waveguides within bulk material, which operate in a similar fashion to optical fibres. The waveguides are formed by using ultrashort pulse laser inscription to modify the refractive index of the material along a path through the material. One example of a method for forming waveguides in bulk material is described in WO 2008/155548, which is hereby incorporated by reference.

It has also been suggested to form Bragg gratings in such waveguides by varying the refractive index properties along the path. For example, single scan ultrashort pulse laser inscription using either low repetition rate systems where the period of grating is controlled by the sample scan speed or high repetition rate systems where the period is controlled using modulation of the pulse train (for example using an acousto-optic modulator) have been suggested as a method of forming waveguide Bragg gratings.

Examples of methods of forming waveguide Bragg gratings using laser inscription have been described in WO 2007/134438, in which individual laser modified volumes in a transparent substrate with pre-determined distances between them in a transmission direction function as both gratings and waveguide structures. The technique described in WO 2007/134438 uses a single laser pass through the material to form the waveguide and grating structures in a sample, and the grating period is controlled by a scan speed of the sample through a focused pulse train. A similar technique is described in an article by Zhang and Herman at www.photonics.com/Article.aspx?AID=31911.

An alternative approach is described in Marshall et al (Opt.Letters, 31, 18, 2690) in which a double pass technique is used. A laser is scanned along a path through the material once to form a waveguide structure and is scanned along the same path a second time to modify the properties of the waveguide to form a grating structure.

However, the control over properties of waveguide or grating devices fabricated using known techniques of laser modification of bulk materials can be limited, and the range of waveguide or grating structures that can be produced in practice is also limited. That in turn limits the possibilities of using such techniques for producing practical sensor systems or for producing interrogators for such sensor systems.

It is an aim of the present invention to provide an improved or at least alternative method of forming optical devices.

SUMMARY

In a first, independent aspect of the invention there is provided a method of forming an optical device in a body, comprising: performing a plurality of laser scans to form the optical device, each scan comprising relative movement of a laser beam and the body thereby to scan a laser beam along a respective path through the body to alter the refractive index of material of that path, wherein the paths are arranged to provide in combination a route for propagation of light through the optical device in operation that is larger in a direction substantially perpendicular to the route for propagation of light than any one of the paths individually.

By using a plurality of scans an optical device, for example a waveguide, of any desired dimensions and properties can be formed in a body. That can provide for improved control over the properties of the device, for example improved control over the transverse profile of the device and improved mode size control. Improved mode matching to an input waveguide or fibre and reduced insertion losses can also be provided.

The improved control over the transverse profile of the waveguide or other device can also provide for the production of a wider range of devices, and improved control over their properties in comparison with known single-scan techniques.

The combination of paths may comprise a single, combined route for propagation of light, for example a light beam or pulse, through the device. The propagation of light through the device may comprise propagation of light from an input of the device to an output of the device.

The paths in combination may provide a predetermined refractive index profile for the device. The predetermined refractive index profile may be a predetermined variation of refractive index with position in a direction substantially perpendicular to the path direction and/or direction of propagation.

The scanning of the laser beam may comprise causing relative movement of the body and the laser beam.

The body may comprise any dielectric material that is at least partially transparent to the writing laser beam wavelength including glasses such as silicates, borosilicates, doped or modified silicates, phosphate glasses, doped or modified phosphates, chalcogenide glasses, doped or modified chalcogenides, crystalline materials such lithium niobate, yttrium aluminium garnet and also doped, poled or modified crystals such as periodically poled lithium niobate or Neodymium doped yttrium aluminium garnet, laser or amplifier gain media such as rare earth doped glasses and crystals.

The light may comprise visible light or non-visible light, for example one or more of infra-red light, ultra-violet light or x-rays.

Each path may be offset in a direction substantially perpendicular to the path direction or propagation direction from at least one other of the paths.

For each of the scans, the path scanned by the laser beam may abut or at least partially overlap at least one of the other paths.

Thus, a desired profile of the optical device can be built up. It has been found that the use of overlapping or abutting regions of scanned material provides a particularly accurate and effective way of building up a desired device profile.

Each of the paths that overlap may be a respective region of material along which a portion of the laser beam profile having an intensity above a threshold level is moved during the scan for that path. The threshold level may be $\sqrt{2}$ of the value of the intensity at the focal point of the laser beam.

The paths scanned by the laser beam may abut or at least partially overlap at least one other of the paths in a direction substantially perpendicular to the path direction and/or the propagation direction.

The method may further comprise selecting the location of each path and/or selecting at least one property of the laser beam to provide an optical device having at least one desired property.

The location of each path and/or at least one property of the laser beam may be selected to provide a device having a desired geometry and/or having at least one desired optical property. For example, the location of each path and/or at least one property of the laser beam may be selected to provide a device with a desired transverse profile and/or to provide a device that is mode matched to a further device or input or output source, for example that is mode matched to a waveguide.

The optical device may comprise a waveguide.

For each path, the scanning of the laser beam along the path may comprise altering the refractive index of material of the path such that the path forms part of the waveguide.

The scanning of the laser beam along a path may comprise scanning a focal point of the laser beam along the path. The method may comprise, for each path, focussing the laser beam on the path.

The method may further comprise controlling the laser beam for each of the paths to provide a variation of refractive index with position along the propagation direction.

Controlling the laser beam may comprise controlling at least one property of laser radiation of the beam, for example at least one of amplitude and frequency. The radiation may comprise pulsed radiation and the controlling of the laser beam may comprise controlling at least one of pulse duration, pulse separation and pulse frequency. The controlling of the laser beam may comprise interrupting, deflecting or focussing or defocusing the laser beam.

By providing for a variation of refractive index with longitudinal position along the propagation direction, further types of optical devices can be formed instead of or in addition to waveguides. In one particularly useful example, the method is used to form a grating structure.

The variation in refractive index for the paths may be such as to form a grating structure.

The method may enable the production of high quality waveguide gratings in laser inscribed devices, in particular ultra-short pulse laser inscribed devices, and such waveguide gratings can be used in turn as components of more complex systems, for example integrated sensors, interrogators, or waveguide lasers.

The use of a multiscan technique to form the grating structure can be particularly advantageous as it is possible to tailor the tilt and general profile of the grating modulation. This gives a degree of flexibility and functionality that may not be available in previously known direct-write methods. It can also provide for grating structures of greater quality and for an increased level of control over grating properties. For example, in certain embodiments it can provide for complete control of grating pattern, arbitrary apodisation (for example for pulse shaping or dispersion control), transversely shaped gratings, tilted gratings (for example for sensing or polarisation control) or curved gratings (for example for control of an output coupled wave-front).

The variation in refractive index may comprise a periodic variation in refractive index with position.

The variation of refractive index with position may be substantially the same for one of the paths as for at least one other of the paths.

The variation of refractive index may comprise at least one local maximum value (and/or local minimum value) of refractive index. The method may comprise controlling the laser beam so that at least one local maximum value (and/or local minimum value) of refractive index for a path occurs at substantially the same position along the propagation direction as a corresponding at least one local maximum value (and/or local minimum value) of refractive index for at least one other of the paths.

For at least one path the variation of refractive index with position along the propagation direction may be offset, in comparison to the variation in refractive index with position along the propagation direction for at least one other path.

The variation of refractive index along each path may comprise at least one local maximum value (and/or local minimum value) of refractive index. The method may comprise controlling the laser beam so that the position of at least one local maximum value (and/or local minimum value) of refractive index for a path is offset in comparison to the position of a corresponding at least one local maximum value (and/or local minimum value) of refractive index for at least one other of the paths.

By providing for an offset in refractive index with position along the propagation direction, a wider variety of optical devices can be formed. One particularly useful example is the formation of tilted grating structures.

The variation in refractive index may be such as to provide a tilted grating structure.

Tilted grating structures can be particularly useful as components of systems such as tilted grating sensors, tilted output filters and distributed beam shaping components.

The use of a multi-scan method allows tilted gratings to be written in bulk samples, for example bulk glass or crystalline samples.

The use of a multiscan method to form waveguides and other devices in a bulk sample enables the use of a wide variety of different components and the efficient interlinking of such components. In turn that can enable the production of complex optical devices or systems within a single bulk sample, using a laser scanning technique, and can thus provide for robust optical devices and systems of small size, for example having a small footprint. In contrast, corresponding known optical devices or systems often require a variety of separate components to be physically attached or aligned with each other, providing for less robust systems or devices, of greater complexity of construction and of greater size.

In a further independent aspect of the invention there is provided a method of forming an optical system in a body comprising forming a plurality of optical devices in the body, each optical device being formed using a method as claimed or described herein.

The method may comprise forming the devices such that in operation at least a portion of one of the devices is coupled to at least one other of the waveguides.

The system may comprise a plurality of waveguides that, in operation, are evanescently coupled.

The method may comprise forming one of the devices to include a grating structure and to form another of the devices to include a further grating structure and/or a waveguide, and the devices may be arranged so that in operation the grating structure is coupled to the further grating structure or the waveguide.

The method may comprise forming a grating coupler system.

The method may comprise forming a plurality of cascaded grating coupler devices.

In another independent aspect of the invention there is provided a laser apparatus for forming an optical device in a sample comprising: a laser source for providing a laser beam; a sample space for a sample; focusing optics for focussing the laser beam in the sample space; means for causing relative movement between the laser beam and the sample space; and a controller for controlling operation of the laser source and the means for causing relative movement, wherein the controller is configured to operate to control the laser source, focusing optics and/or means for causing relative movement thereby to perform a plurality of laser beam scans, each scan comprising scanning the laser beam along a respective path through the sample space to alter the refractive index of material of a sample if present in the sample space, wherein the paths are arranged to provide in combination a route for propagation of light through the optical device in operation that is larger in a direction substantially perpendicular to the route for propagation of light than any one of the paths individually.

The controller may be configured to control the laser source, focusing optics and/or means for causing relative movement such that each path may be offset in a direction substantially perpendicular to the path direction or propagation direction from at least one other of the paths. For each of the scans, the path scanned by the laser beam may abut or at least partially overlaps at least one of the other paths.

The controller may be configured to select the location of each path and/or selecting at least one property of the laser beam to provide an optical device having at least one desired property. The optical device may comprise a waveguide.

The controller may be configured to the laser source, focusing optics and/or means for causing relative movement for each of the paths to provide a variation of refractive index with position along the propagation direction.

The variation in refractive index for the paths may be such as to form a grating structure. The variation of refractive index with position may be substantially the same for one of the paths as for at least one other of the paths.

For at least one path the variation of refractive index with position along the propagation direction may be offset, in comparison to the variation in refractive index with position along the propagation direction for at least one other path.

The variation in refractive index may be such as to form a tilted grating structure.

In another independent aspect of the invention there is provided a tilted grating structure formed in a non-fibre-optic body. The tilted grating structure may comprise a waveguide Bragg grating.

In another independent aspect of the invention there is provided a grating coupler system comprising a plurality of grating devices that, in operation, are coupled, wherein the grating coupler system is formed in a non-fibre-optic body.

The tilted grating structure and/or the grating coupler system may be formed by laser inscription of the body. The body may comprise a bulk glass or crystal body.

There may also be provided a method, device or system substantially as herein described with reference to the accompanying drawings.

Any feature in one aspect of the invention may be applied to other aspects of the invention, in any appropriate combination. For example, device or system features may be applied to method features and vice versa.

DETAILED DESCRIPTION OF EMBODIMENTS

Embodiments of the invention are now described, by way of non-limiting example, and are illustrated in the following figures, in which.

Figure 1:
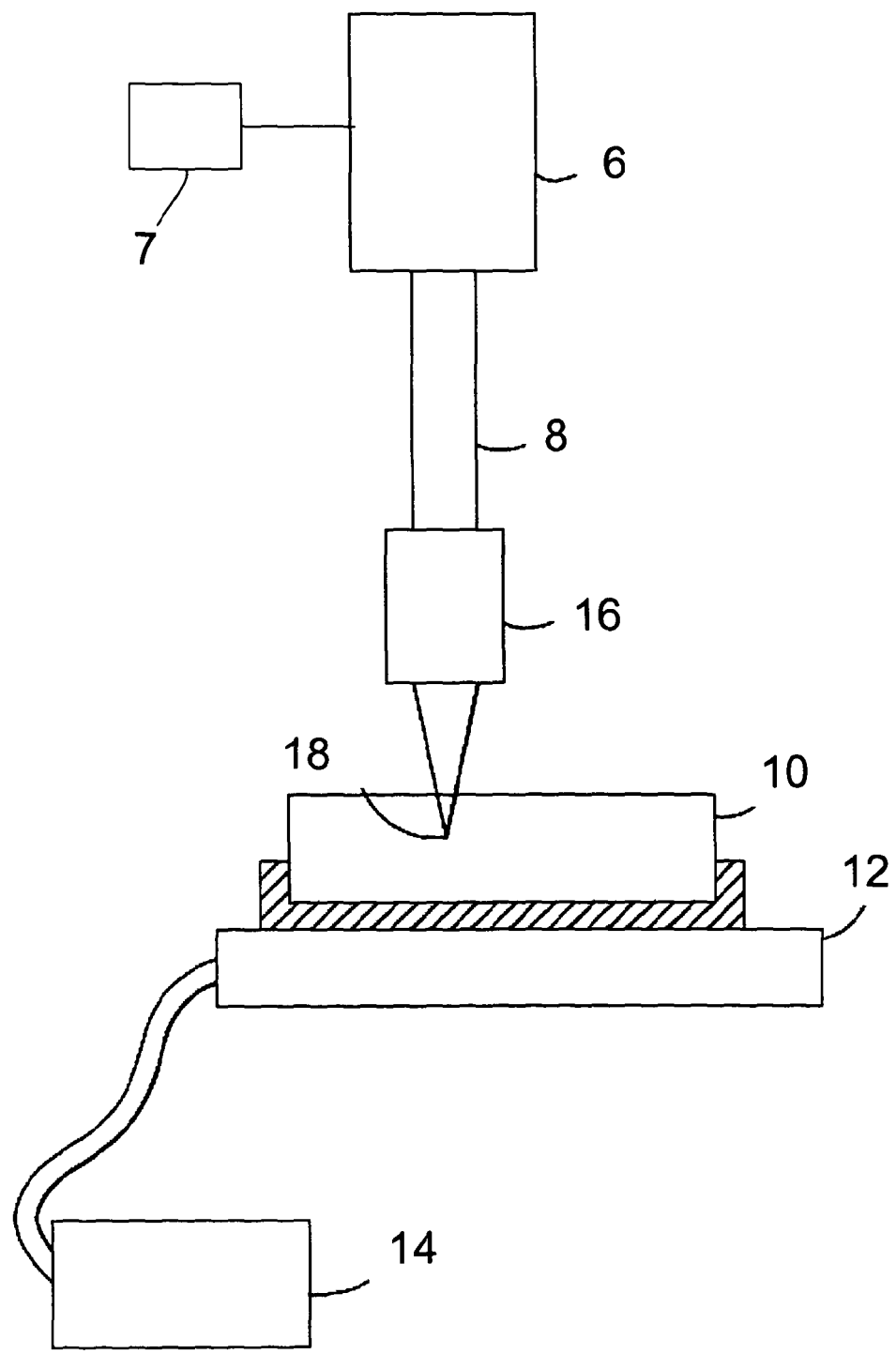
FIG. 1 is a schematic diagram showing laser writing apparatus for forming an optical structure in a bulk sample according to one embodiment.

FIG. 1 shows a laser system for writing apparatus for forming an optical structure in a bulk sample. The laser system comprises an IMRA u-Jewel D-400 component 6 that has an associated acousto-optic modulator 7 that can modulate the pulse train from the IMRA, and is combined with an RF driver (21080-2AS) that drives the acousto-optic modulator and that is externally modulated by a signal generator (Keithley 3390). The laser has an external compressor stage, for emitting a beam of laser radiation 8 for forming waveguides in a radiation sensitive material 10, for example suitable glass or crystal material.

In the embodiment of FIG. 1, the material 10 is carried in a sample space on a stage structure 12 that can be moved under the control of a computer based control unit 14. The stage structure 12 comprises a series of air bearing Aerotech translation stages in three dimensions. (ABL1000 XY and AVL125 vertical). The lateral resolution of the stages is 2 nm.

In operation, the beam 8 is focused vertically down onto the material 10 by a lens system 16, for example comprising an aspheric lens or microscope objective having a numerical aperture of 0.4 to 0.67. The beam delivery optics are mounted to a granite arch to minimize vibration and thermal movements. The beam reaches a focal point 18 at a point of the material 10 where a waveguide or other optical structure is to be formed.

The high optical power density causes a number of nonlinear optical effects in material at the focal region of the beam resulting in permanent refractive index modification of the material in that region. The substrate can be moved in three dimensions under the focused beam by computer controlled movement of the stage structure 12, thus causing a track of refractive index modification. The pulse train focused inside the material induces a permanent refractive index modification related to a focal volume that is above a threshold level of intensity. The translation of the sample through the focus results in an extrusion of the modified volume to create a waveguide. In alternative embodiments the substrate remains stationary and the laser beam is moved relative to the substrate.

Through tailoring of the laser parameters, such as power, polarization, pulse length and speed of translation, structures can be created which efficiently act as waveguides, or other optical structures, for optical radiation at a range of wavelengths.

The laser parameters that are used depend on the material properties of the sample, and on the desired modifications. In one embodiment, the sample is borosilicate type, Eagle-2000, glass and the writing laser has a wavelength of between 800-1500 nm, pulse energy of in the region of 10 nJ-10 μJ and a pulse width between 100 femtoseconds and 5 picoseconds. A repetition rate of between 50 kHz-5 MHz is used in this example, although a wider range of repetition rates is available in other examples, for example from 100 kHz to 5 MHz. Those laser parameters enable the inscription of a waveguide structure in the sample.

It is an important feature of the embodiment that a waveguide, or other optical structure, is produced in the sample by multiple scans of the laser beam through the material, for example to build up a desired refractive index profile. Waveguides can be written in a single translation however by building up the waveguide or other optical structure in series of slightly offset multiple passes or scans allows for significantly more design freedom, allowing the construction of a wide range of complex optical systems not accessible using single scan techniques.

In order to construct a waveguide or other optical structure using a multiple scan technique, accurate control of the positioning of the sample relative to the laser beam is needed. In the embodiment of FIG. 1, the positional synchronised output (PSO) feature of the Aerotech system is used, which provides one, or a series, of electrical trigger signals at a specified position. The trigger signals are received from stage encoder channels of the Aerotech system which are highly accurate mechanical scales that are used to determine and track changes in axis position relative to a pre-defined home position of the sample translation stages. The trigger signals are used to synchronize the signal generator and AOM, and provide for accurate, triggered modulation of the laser beam, by way of precise control of position-triggered signals from the sample translation stages. An additional interface electronic board is also used to process the output from Aerotech PSO electronics to remove the effects of spurious spikes which can disrupt accurate triggering. The spurious spikes that are randomly observed on the PSO trigger signal precede a main gate signal that serves to activate the external modulation from the AOM driver. The spikes, if not removed, can confuse AOM triggering such that proper triggering and subsequent gating of the modulation signal may not be achieved. The additional interface electronics board is used to correctly condition the signal by latching to an initial incoming rising signal and holding the signal high for around 100 microseconds. That buffers the output such that any spurious glitches on the leading edge of the trigger are not passed to the AOM driver trigger input.

The use of the PSO output allows the relative positioning of the focal region of the laser beam within the sample between successive scans to be controlled to an accuracy of around 2 nm using the Aerotech system.

Figure 2:
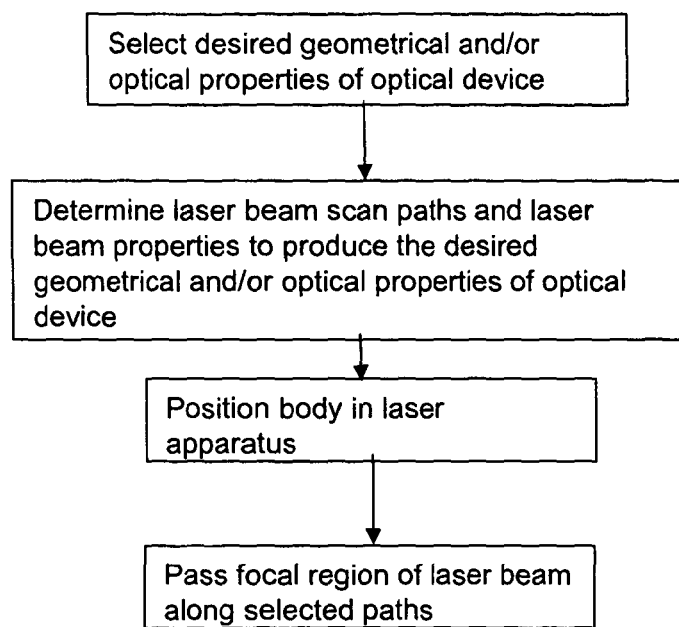
FIG. 2 is a flowchart illustrating in overview a method for forming an optical device.

FIG. 2 is a flowchart illustrating in overview a method for forming an optical device. In the first stage of the method, desired geometrical and/or optical properties of the optical device are selected. A plurality of different laser beam scan paths and laser beam properties to produce the desired geometrical and/or optical properties are selected at the next stage. A body is then positioned in the laser system, and a focal region of the laser beam is scanned along the selected scan paths to produce the optical device.

Figure 3A:
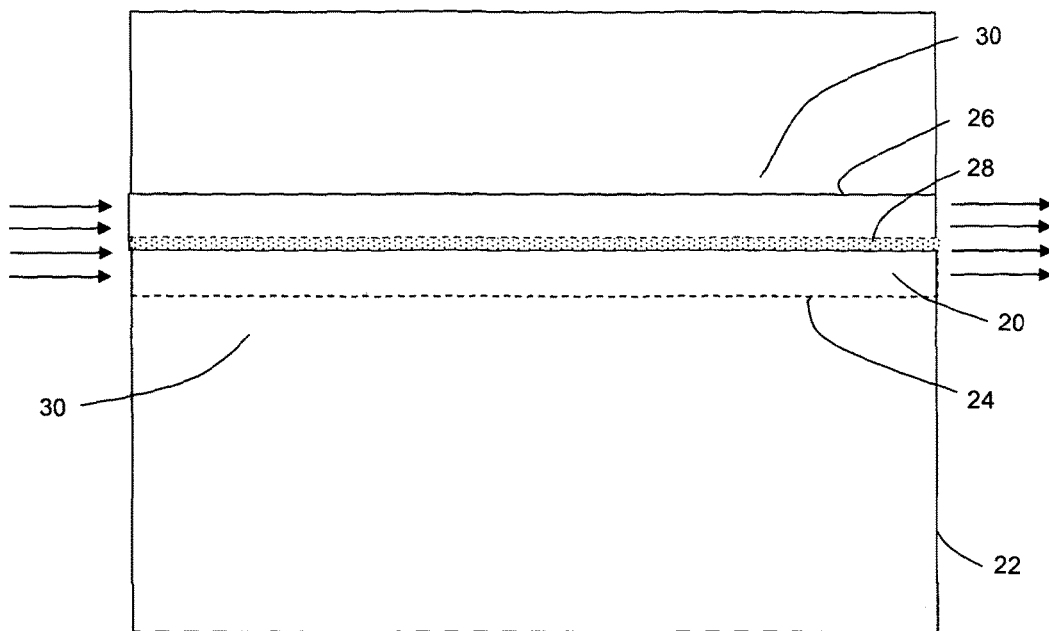
FIG. 3a is a schematic illustration of a waveguide formed in a bulk glass sample.

FIG. 3a is a schematic illustration of a waveguide 20 formed in a bulk glass sample 22 of dimensions 2 mm×10 mm×15 mm by ultrafast, for example femtosecond, laser inscription using multiple scans. The waveguide comprises path 24 (delimited by dashed lines in the figure) and path 26 (delimited by solid lines in the figure) that overlap. The overlap region 28 between the paths is indicated by dots in the figure. FIG. 3a is not to scale, the waveguide is significantly smaller in comparison to the sample 22 than indicated in FIG. 3a, but is expanded in the figure for clarity.

Each of the paths 24, 26 is formed by scanning of a focal region of the laser beam along the path during a respective scan. The refractive index of the material of each path is altered by the laser beam and is different to the refractive index of the material 30 outside the paths 24, 26. The difference in refractive index between the material of the paths and the material outside the paths causes light passing into and propagating along the waveguide to be confined within the waveguide. The propagation of light into and out of the waveguide is indicated schematically in FIG. 3a by solid arrows. In the embodiment of FIG. 3a, the path directions and the propagation direction are substantially the same. In alternative embodiments or modes of operation the path directions and the propagation direction of light through a resulting device may be different.

The depth at which a waveguide or other device may be formed inside the material depends on the working distance of the inscription lens and is commonly anything from 100 microns to 2000 microns. The width of the multiscan waveguide is generally between 4 and 12 microns depending on the intended operating wavelength of the device. For example, for a waveguide in Eagle 2000 glass intended to operate at a wavelength of 1550 nm the waveguide width and height is around 8 microns. The maximum length of a waveguide or other device is usually determined by the range over which the sample can be translated during the production process, which for the embodiment of FIG. 1 is the range of the translation stages. Samples can be as large or small as required, dependent on the translation stage range.

Figure 3B:
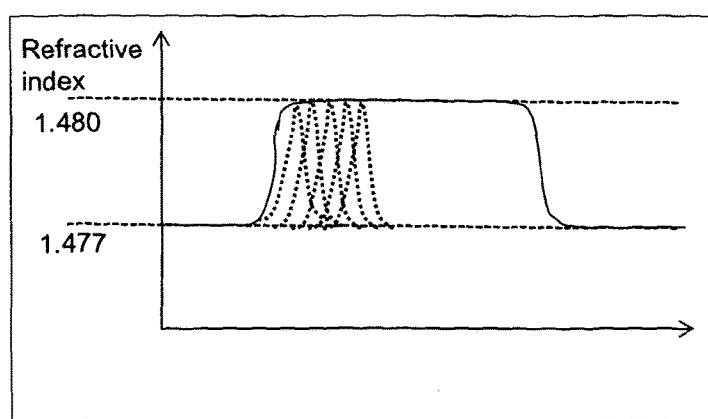
FIG. 3b is a diagram showing how the refractive index varies across the waveguide of FIG. 3a in a direction transverse to the propagation direction.

FIG. 3b is a diagram showing how refractive index varies, in a direction transverse to the propagation direction (and path directions) of a further waveguide produced in Eagle 2000 glass using a multiscan technique. In this case, the waveguide is similar to that of FIG. 3a but is built up using around 15 overlapping scan paths. The refractive index changes produced by five of the scans individually are represented by dotted lines, and the variation of the refractive index of the waveguide structure as a whole is represented by a solid line. It can be seen that the refractive index of the material of the device of FIG. 3b is altered from a value of 1.477 to a value of 1.480 by the multiple, overlapping laser inscription processes.

For devices, such as that of FIG. 3b, made of Eagle 2000 glass, the refractive index is usually altered by around 0.2% to 0.3% by the multiscan laser inscription process. The change in refractive index obtained by the multiscan process depends on the material, and can be as high as 5% in chalcogenides or as low as 0.0005%.

In the device of FIG. 3b, the single scan index profiles overlap and produce a combined change in refractive index. For the Eagle 2000 material of FIG. 3b, the refractive index changes produced in a region of the material saturate after a certain number of scans through the material, and so by using a relatively large number of closely overlapping scans provides a device with a step-like refractive index profile at the edges of the device and a smooth, substantially constant refractive index profile away from the edges, which is generally desirable for waveguides and many other devices.

The degree to which the refractive index changes saturate with repeated scans, and the number of scan required to produce saturation, depends on the material and the laser parameters used.

For example, the number and positioning of scan paths chosen to produce an 8 micron wide waveguide changes with materials and laser parameters—in the case of Eagle 2000 glass, it has been found that 20 scans over an 8 micron width can provide for optimisation of propagation loss, and there is no improvement if, for example, 25 scans or 50 scans are used.

In alternative embodiments, each region of material that has its refractive index profile altered above a threshold level by a respective laser scan may abut, or be separated from, rather than overlap other such regions, although the regions may still combine to make a single propagation path. The threshold level may be for example $\sqrt{2}$ of the maximum value of the refractive index change produced by the scan.

By forming a waveguide using multiple scans, as shown schematically in FIGS. 3a and 3b, effective control over, and tailoring of, properties of the waveguide can be provided. For example, it is straightforward to select a desired cross-sectional area of the waveguide by selecting the number of abutting or overlapping paths that form the waveguide. The cross-sectional shape of the waveguide can also be selected by selecting the relative number of abutting or overlapping paths in each of the two direction orthogonal to the path directions. The variation in physical properties also causes a variation in optical properties, for example mode size, and the use of a multiple scan technique can provide for improved mode size control and mode matching, and can reduce insertion losses. For example, the properties of a waveguide structure can be selected, and built up using multiple scans, to mode match to a single mode fibre.

It will be understood that the reference to paths is to the paths followed by the refractive-index altering focal region of the laser beam during the scans. In general, once all of the scans have been performed, each path does not form a separate light propagation path. Instead in operation light propagates along the waveguide as a whole, made up of the combination of paths. In general, if one of the paths were to be considered in isolation (for example before the other paths have been scanned) it would either not support the guidance of a waveguide mode or any such waveguide mode would not have the desired mode profile and would result in an asymmetric mode or a mode that is the wrong size to couple with low loss to another waveguide or fibre mode. Waveguides or other devices are made up a combination of the paths (regions of material that have had their refractive index profile altered by laser scans).

As well as producing waveguide structures, the multi-scan technique can be used to produce other optical structures and to produce more complex optical systems including multiple components.

If the pulse train is modulated (using acousto-optic modulation or any other form of modulation) whilst the sample is translated the optical structure is also modulated. For example, using precise modulation triggered by the sample stages 12, periodic or aperiodic index changes can be built up using multiple scans. Arbitrary apodisation, chirp, phase shifts or cascaded gratings can be fabricated with the appropriate control of the pulse train modulation.

For example, Bragg grating structures can be created within the material by rapidly modulating the writing beam to produce periodic gratings with features sizes that may be less than 1 micron. The spectral position and shape of the Bragg response can be accurately controlled by altering the translation speed and/or modulation frequency. It is also possible to achieve chirped gratings in this way.

Depending on the material a range of writing parameters can be used to form grating structures. For example, in a bulk sample of a borosilicate glass such as Eagle 2000 a writing laser of wavelength between 800-1500 nm, a pulse energy of in the region of 10 nJ-10 µJ, a pulse width between 100 fs-5 ps, and repetition rate of between 50 kHz-5 MHz may be used to form a grating structure.

Figure 4:
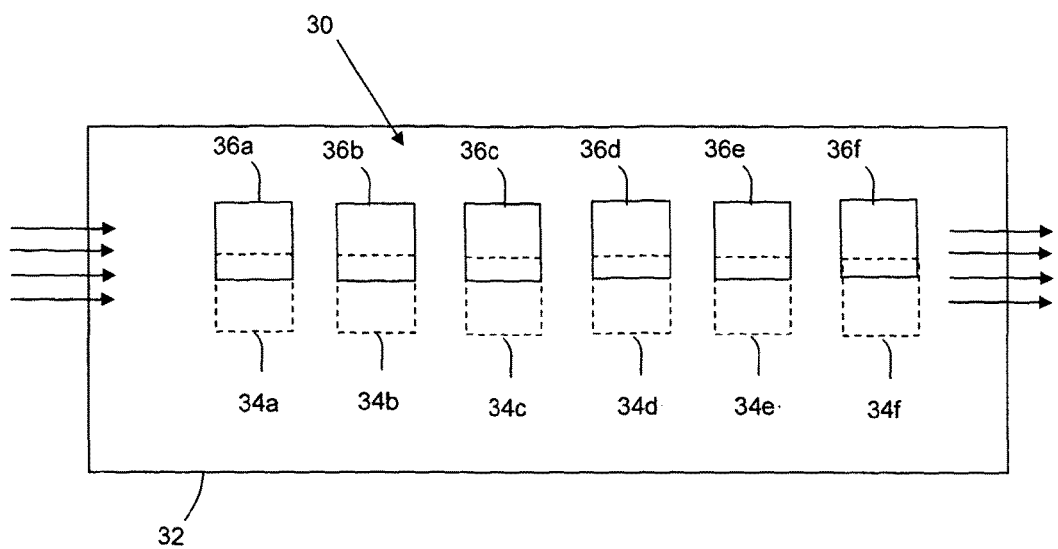
FIG. 4 is a schematic diagram of a Bragg grating structure formed in a sample using a multiscan technique.

A Bragg grating structure 30 formed in a sample 32 using a multiscan technique is illustrated schematically in FIG. 4. In this embodiment, one path comprises a series of periodically spaced regions 34a-34f in which the refractive index is altered by the scanning laser beam, and another path comprises another series of periodically spaced regions 36a-36f in which the refractive index is altered by the scanning laser beam. The spacing of the regions is selected to correspond to a desired Bragg wavelength of the device.

In the embodiment of FIG. 4, the variation of refractive index along each path is substantially the same for each of the paths, and the spatially modulated refractive index regions 34a-34f and 36a-36f are precisely in-phase.

Figure 5:
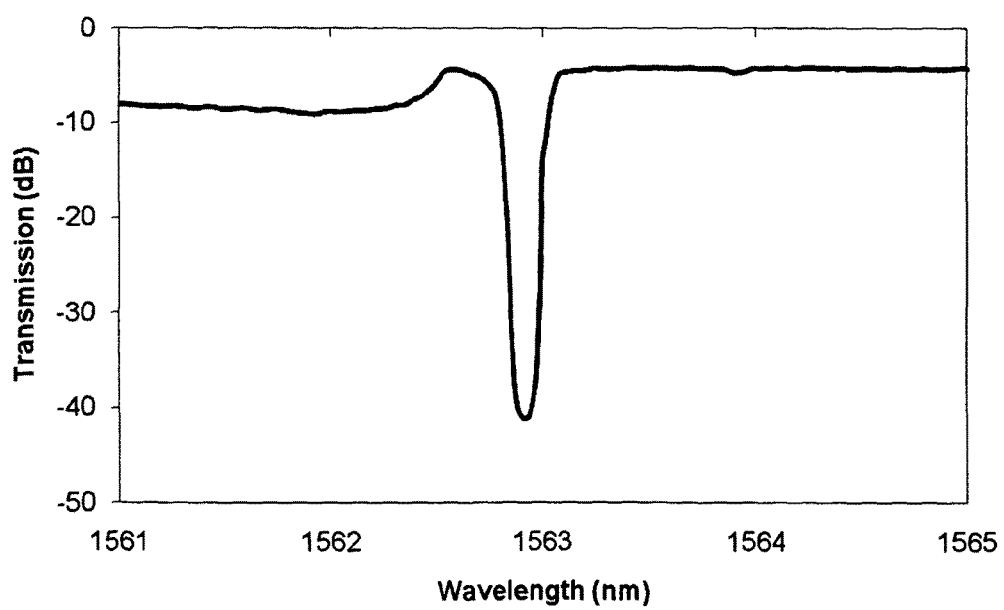
FIG. 5 is a graph of the variation in extinction ratio as a function of wavelength for the Bragg grating structure of FIG. 4.

The multi-scan technique can be used to produce high quality waveguide Bragg gratings in bulk material, with desired mode sizes and effective control over optical properties, compared to gratings produced using corresponding single scan techniques. Such laser-inscribed waveguide Bragg gratings can provide higher extinction ratios than previously reported, for example >30 dB and in some cases up to 40 dB. The variation in extinction ratio as a function of wavelength for a waveguide Bragg grating formed in a bulk sample of borosilicate type, Eagle-2000 glass is shown in FIG. 5.

The grating shown in FIG. 4 is a planar grating, which reflects, and transmits, light in the direction of propagation. The multi-scan technique can also be used to produce a variety of other grating structures having any desired grating profile, including curved, aperiodic or tilted gratings, by suitable selection of path arrangements and suitable selection of laser parameters for the inscription of each path.

Figure 6:
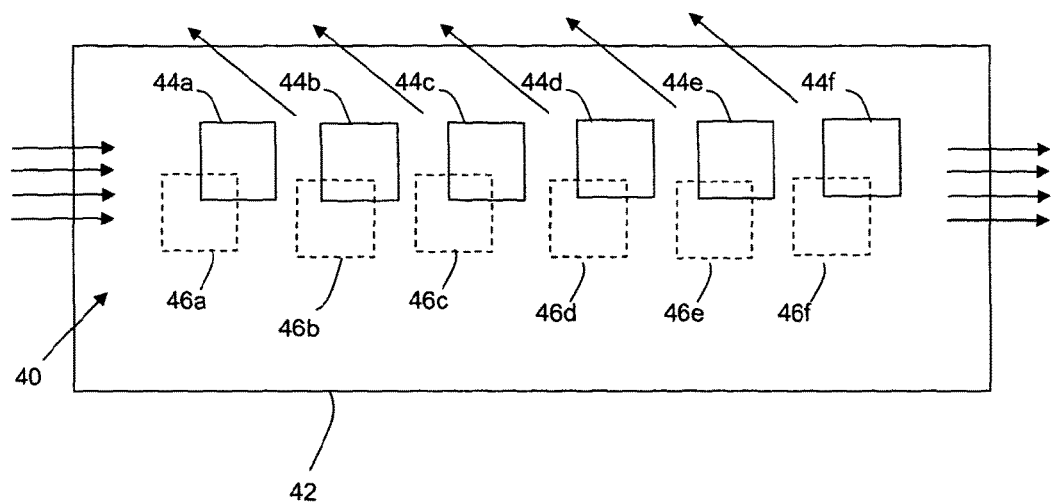
FIG. 6 is a schematic diagram of a tilted grating structure formed in a body using a multiscan technique.

A tilted grating structure 40 formed in a body 42 using a multiscan technique is illustrated schematically in FIG. 6. The grating structure 40 is similar to that shown in FIG. 4 and comprises a plurality of overlapping or abutting path regions, each path region comprising a series of periodically spaced regions 44a-44f and 46a-46f in which the refractive index has been altered by the scanning laser beam. The spacing of the regions is selected to correspond to a desired Bragg wavelength of the device.

The grating structure 40 of FIG. 6 is similar to that of the grating structure 30 of FIG. 4, but the variation in refractive index for each of the paths is offset in a direction along the path, in comparison to the variation in refractive index along another of the paths, in this case the adjacent path. Thus, a tilted grating structure is provided.

The tilt of the grating structure can be precisely controlled by controlling the offset between scans. The offset can be controlled either by controlling the synchronisation of the sample movement with the laser beam modulation (the signal that initiates the modulation is delayed or advanced by the required amount on each successive scan) or the sample is translated in x and y whilst the modulation initialisation signal is sent at specific x (or y) positions regardless of the y (or x) position.

In operation, the tilted grating allows the coupling of a back reflected signal out of the structure, for example allowing the signal to be detected or measured, or coupled into another structure.

In the embodiments of FIGS. 3, 4 and 6 only two paths are shown as making up the optical structures, however it will be understood that any suitable number of paths and any suitable arrangement of the paths in three dimensions can be selected in order to produce a desired optical structure.

For example, a structure could be 8 microns in width, formed using 20 scans. An offset of each element in the scan direction can be used to build the tilted grating structure, for example if there is an offset of 0.4 microns in the propagation direction between each scan a tilt of 45 degrees in the plane formed by the index change elements will be provided.

Grating structures may be formed in combination with waveguide structures to provide for the guided input and output of light to the grating structure. A combination of a grating structure 50 and associated waveguide structures 52, 54 formed in a body 56 is illustrated schematically in FIG. 7, which again is not to scale. In this case, the overlapping path regions forming the grating structure are indicated schematically by the dashed lines, and the overlapping path regions forming the waveguide, non-grating structures 52, 54 are indicated by the solid lines (neither the solid lines nor the dashed lines are shown in FIG. 7 as overlapping, for clarity, although the paths that they represent overlap).

Figure 7:
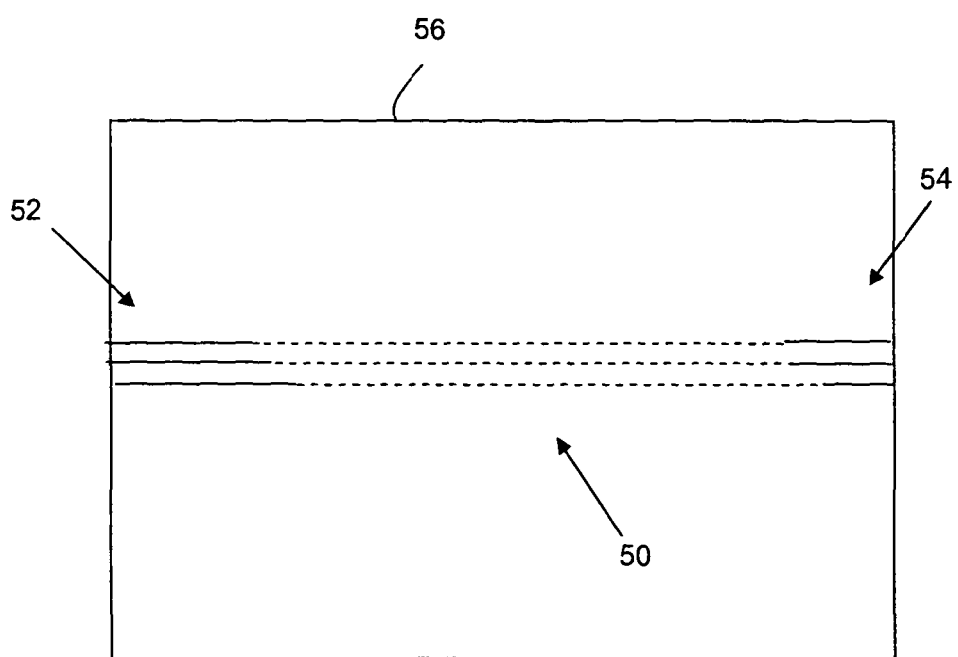
FIG. 7 is a schematic diagram of a combination of a grating structure and associated waveguide structures formed in a body.

In the embodiment of FIG. 7, the structures 50, 52, 54 are formed of three paths that overlap in a transverse direction. Each of the three paths is formed in a single scan, with the laser properties (pulse separation in this example) being changed part way through each scan to form the part of the path forming part of the grating structure 50.

A wide variety of other structures can be formed within a body using the multi-scan laser inscription techniques, and combined to form more complex optical structures or devices within a single body. For example, the multiscan technique can be used to produce chirped gratings, grating couplers, dispersion control, laser mirrors, pulse compression devices, curved gratings and tilted grating devices.

A further device is illustrated schematically in FIG. 8, which again is not drawn to scale. In this case two tilted gratings 60, 62 are formed in a body 64 using a multiscan technique. The tilted gratings 60, 62 each form part of a respective waveguide structure (not shown) that in operation guides light to and from the grating structure, and which is formed together with the grating using the multiscan technique.

The tilted gratings are aligned so that in operation light (indicated by solid arrows in FIG. 8) propagating along one of the waveguides is reflected from the grating 60 into another of the gratings 62 and then along the other waveguide structure. Thus, a coupled grating structure is provided. In operation, a portion of the light from one of the waveguides, at the operating wavelength of the gratings can be sampled for measurement or detection purposes. Effectively, light at the Bragg wavelength is coupled out by the first tilted grating before being reflected into the adjacent waveguide that includes the second tilted grating. The spatial separation of the two waveguides has to be small enough so that divergence is not too great to prevent effective coupling and also large enough so that the two waveguides are not evanescently coupled, for example a minimum separation of 40 microns and a maximum separation of 100 microns would be suitable for waveguides having index differences of 0.01 or lower.

Figure 8:
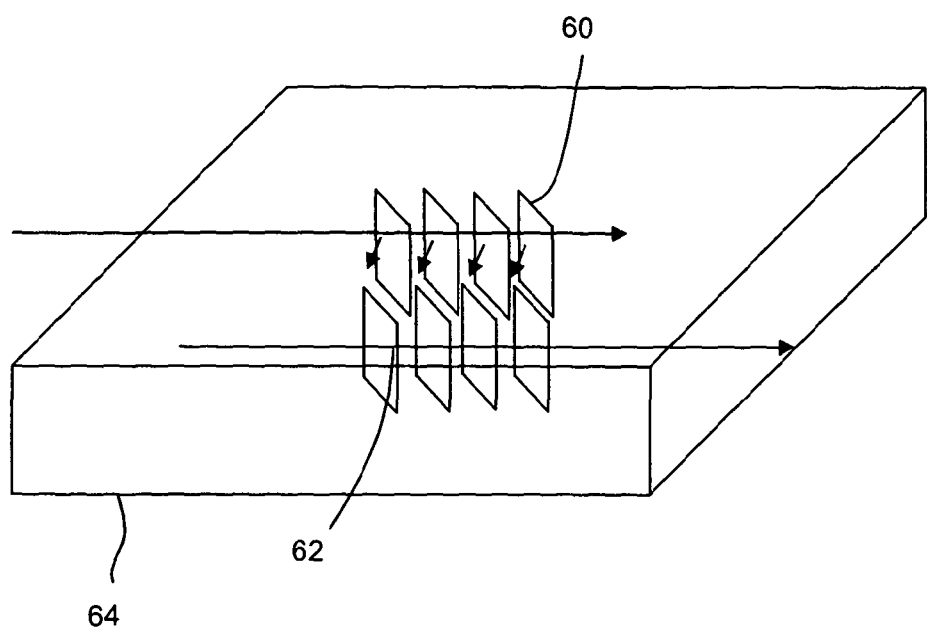
FIG. 8 is a schematic diagram of another optical device formed in a body.

The multiscan technique that enables accurate control over properties of the optical structures can be particularly useful in producing more complex, coupled structures such as that illustrated in FIG. 8, as it enables accurate control over the coupling, which is sensitive to the individual properties and positions of the coupled structures, in this case the gratings.

Figure 9:
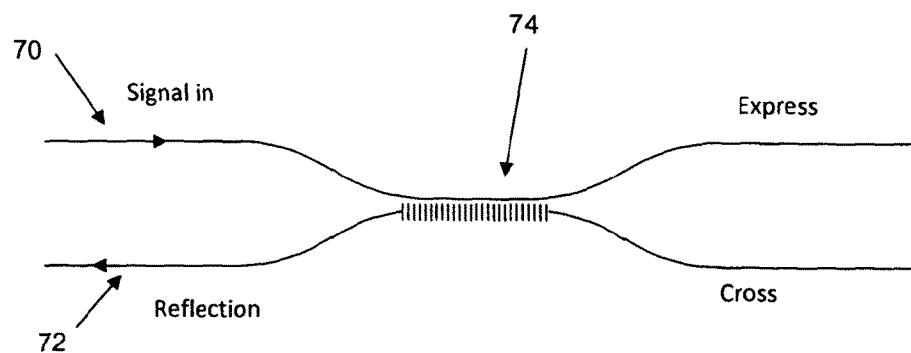
FIG. 9 is a schematic diagram of a waveguide/grating coupler device formed in a body.

Another device formed using a multiscan technique is illustrated in FIG. 9, and comprises a waveguide structure 70 and a further waveguide structure 72 formed in bulk material using a multiscan laser inscription technique. The waveguide structures 70, 72 are formed so that the waveguides run adjacent to each other in a region 74 of the material. The further waveguide structure 72 includes a grating 76, formed during the multiscan laser inscription process, at region 74 of the material. The waveguide structures are arranged so that they are sufficiently close together at region 74 that in operation they are evanescently coupled in region 74.

Evanescently coupled devices can be formed using separation of the waveguides in the range, for example, 0.5 to 30 microns (separation of the closest edges of the waveguide profile). The separation depends on the index difference in the written waveguide—evanescently coupled waveguides have been written with a separation of 2 microns with a evanescent coupling region length of 1 mm up to 30 mm—but much greater separations and lengths can be fabricated with the same or similar performance. In the embodiment of FIG. 9, the coupled waveguides in region 74 are 8 microns wide, single mode at 1550 nm region operation and written in borosilicate glass.

In operation a portion of a light signal input via one of the waveguide structures 70 is coupled to the grating 76 forming part of the further waveguide structure 72. A part of the light coupled into the grating 76 that has a wavelength equal to the operating wavelength of the grating is reflected by the grating 76 and is output at one end of the further waveguide structure 72, as a reflection signal. The remaining part of the light coupled into the grating 76 is transmitted along the further waveguide structure 72 and is output at the other end of the further waveguide structure, and can be referred to as the cross signal. The remaining input light is transmitted along and exits the waveguide structure 70, and is referred to as the express signal.

Figure 10:
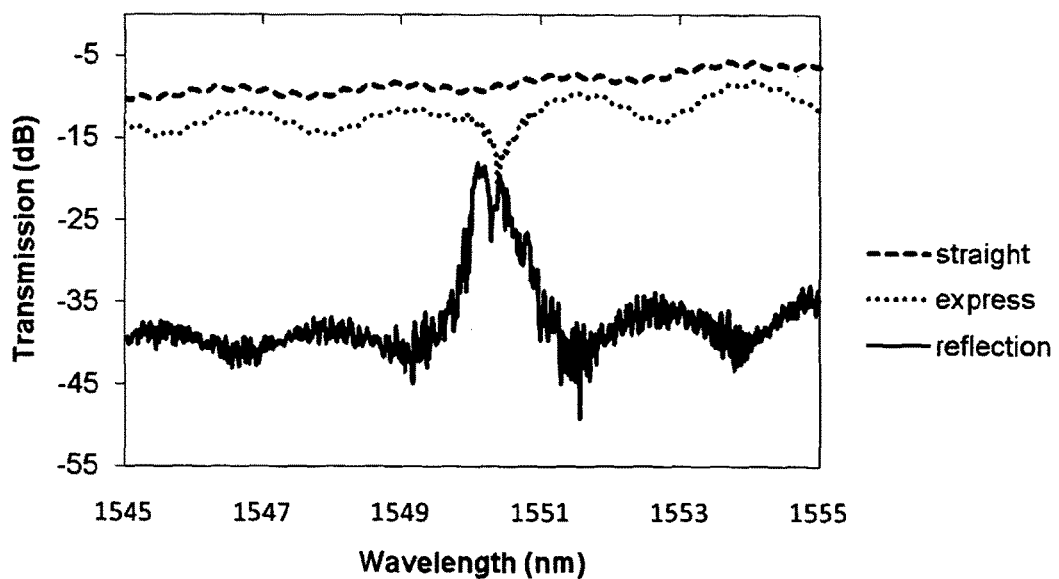
FIG. 10 is a graph of the response of FIG. 9 as a function of wavelength.

The measured response of the device of FIG. 9 is shown in FIG. 10 which is a plot of the express, reflection, and straight signals as a function of wavelength. The straight signal is a signal received from an adjacent straight waveguide (not shown) that has no grating and is not coupled to any other waveguide, and is shown for comparison purposes. In practice, detectors or measurement devices can be provided to detect or measure any of the signals input to or output from the device of FIG. 9. It will be understood that the device of FIG. 9 can have a variety of applications, for example as a filter, which can filter light at the Bragg wavelength of the grating 76, or as a sensor, or as a part of a more complex apparatus. Three dimensional grating coupler devices such as that shown in FIG. 9 can allow wavelength filtering to be closely and efficiently integrated with detectors/sources, due to the control over mode size and coupling that can be provided by the multiscan technique.

In a further device (not illustrated) two devices of the type shown in FIG. 9 are inscribed in the same device. The cross output of the first of the devices, for example, can be formed to connect to the signal input of the second of the devices, thus forming a cascaded grating coupler device. Alternatively any other of the inputs or outputs of the two devices can be formed to connect together to provide cascaded grating coupler devices with different geometries. Such cascaded grating couplers can be used for a range of sensing or measurement applications. The Bragg wavelengths of the cascaded coupler devices can be different from one another and can be selected for a particular application.

It will be understood that the multiscan laser inscription technique can provide for the formation of complex, three dimensional optical devices, including any required number and arrangement of waveguide and grating devices. Multiscan grating components can be located anywhere in a three dimensional photonic circuit. Evanescently coupled waveguides can be inscribed next to the multi-scan grating component to create a grating coupler device whose properties are controlled using the grating period and length.

Figure 11:
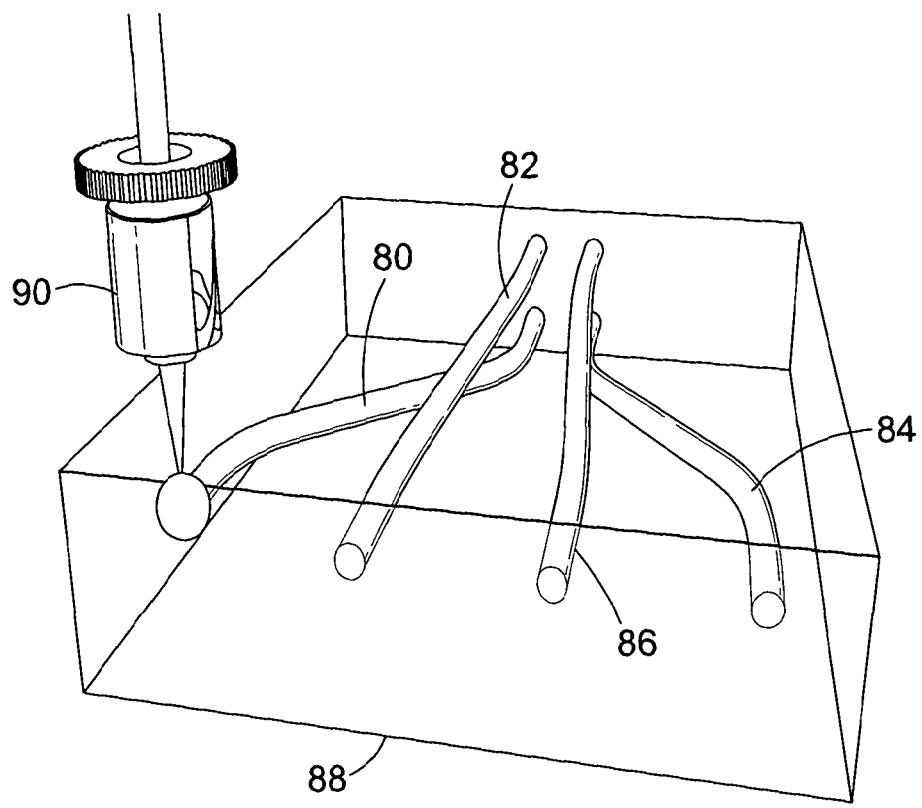
FIG. 11 is a schematic diagram of a three-dimensional laser-inscribed waveguide system.

An example of a further three-dimensional laser-inscribed waveguide system is illustrated in FIG. 11, which is not to scale. The system of FIG. 11 comprises four separate waveguide structures 80, 82, 84, 86 that are arranged in three dimensions within a single bulk piece of material 88. The laser apparatus 90 used to inscribe the waveguides is also shown schematically in FIG. 10.

Figure 12:
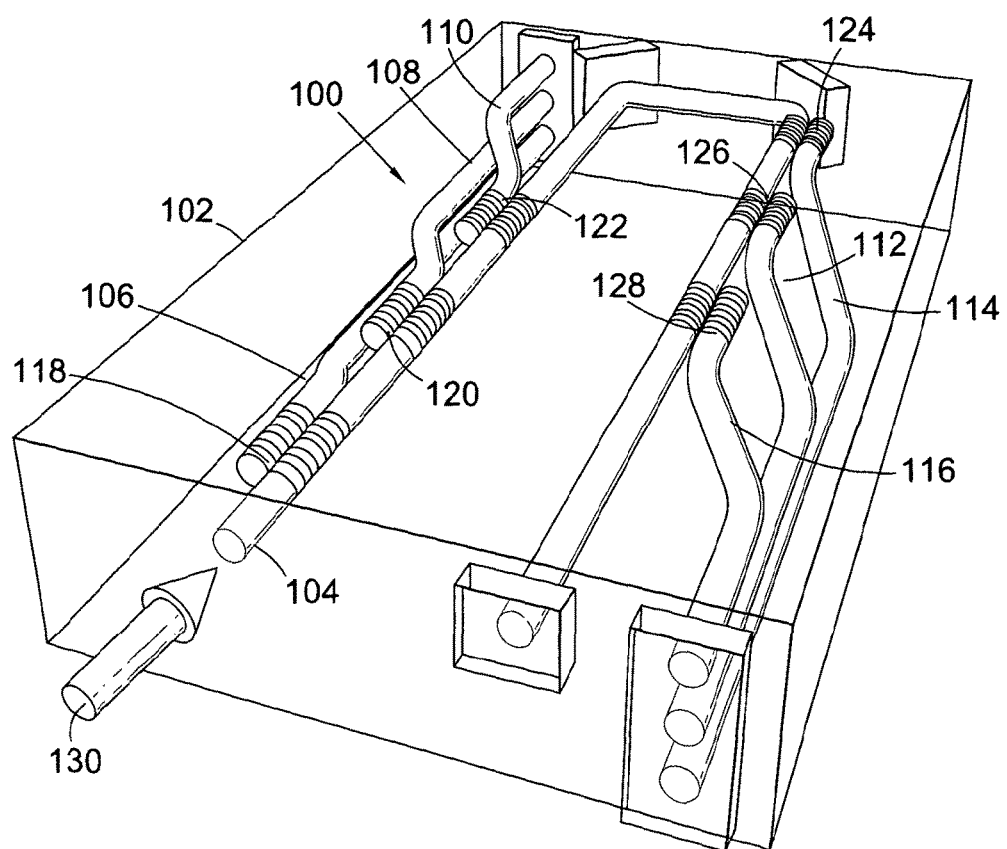
FIG. 12 is a schematic diagram of a three-dimensional grating coupler system.

A further optical system 100 formed in a single piece of bulk material 102 is illustrated schematically in FIG. 12. The system comprises an arrangement of seven waveguide structures 104, 106, 108, 110, 112, 114, 116 formed in the piece of bulk material 102 using ultrafast multiscan laser inscription. Each waveguide structure is made up of 20 overlapping (in a direction perpendicular to the propagation direction) paths of material whose refractive index has been modified by laser treatment. Various pairs of grating structures are formed as part of the waveguide structures, and are located sufficiently close together to be coupled, and thus to couple pairs of waveguide structures, in operation. The direction of propagation of light entering the system is indicated by the solid arrow 130. The device acts as a wavelength demultiplexer or filter that can be used to optically interrogate an incoming signal, and can be used to monitor the wavelength of signals received from a sensor network, for example a fibre Bragg grating sensor network.

Optical devices can be formed in a range of different materials using a multiscan laser inscription technique, for example borosilicate glasses, silicates, phosphates, chalcogenides and crystals, also gain media such as rare earth or transmission metal doped glasses and crystals.

Various embodiments have been described that comprise optical devices using grating structures written by multiscan ultra short pulse laser inscription (MS-ULI). It will be understood that many other devices and systems can be produced using the described methods. Various devices and systems can be produced using the described methods that have applications in end user markets for sensors (for example in construction and other civil engineering, chemical, renewable energy, aerospace or marine engineering, oil/gas, mining, and biotech industries). For example, the methods can be used in certain embodiments to produce waveguides and Bragg grating sensor-interrogators on a single chip to create a low cost, robust sensor interrogator that may, for instance, be integrated with fibre sensing networks. The grating component is such a fundamental building block to so many different devices that the potential fields of application are almost limitless.

The described methods can, in certain embodiments provide for rapid prototyping of devices and systems, as the high repetition rates that can be achieved mean that high scan speeds are possible. The described method can also provide for material design freedom as, with suitable choice of laser parameters, devices and systems can be formed in a range of different materials using the described methods. Furthermore, in many cases no clean room is needed for fabrication of the devices or systems, and fabrication system costs are comparable to those of standard FBG fabrication systems.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A method of forming an optical device in a body, comprising:
   performing a plurality of laser scans to form the optical device, each scan comprising relative movement of a laser beam and the body thereby to scan the laser beam along a respective path through the body to alter the refractive index of material of that path,
   wherein the paths are arranged to provide in combination a route for propagation of light through the optical device in operation that is larger in a direction substantially perpendicular to the route for propagation of light than any one of the paths individually;
   the laser beam comprises a pulse train and the method further comprises receiving a trigger signal for determining a relative positioning of a focal region of the laser beam within the body and using the trigger signal to synchronize a modulator for modulating the pulse train whilst the body or laser beam is translated to provide a change in at least one property of the pulse train based on position along the propagation direction thereby to provide a variation of refractive index with position along the propagation direction such that:
   for at least one of the paths the modulation is such that the variation of refractive index with position along the propagation direction is offset by a required amount in comparison to the variation in refractive index with position along the propagation direction for at least one other of the paths, wherein the offset is controlled by the synchronization between the modulator and the relative positioning of the focal region of the laser beam within the body; and said one of the paths and said at least one other of the paths abut or at least partially overlap one another.

2. A method according to claim 1, wherein each path is offset in a direction substantially perpendicular to the path direction or propagation direction from at least one other of the paths.

3. A method according to claim 1, further comprising selecting the location of each path and/or selecting at least one property of the laser beam to provide an optical device having at least one desired property.

4. A method according to claim 1, wherein the optical device comprises a waveguide.

5. A method according to claim 1, wherein the variation in refractive index for the paths is such as to form a grating structure.

6. A method according to claim 1, wherein the variation in refractive index is such as to form a tilted grating structure.

7. A method of forming on optical system in a body comprising forming a plurality of optical devices in the body, each optical device being formed using a method according to claim 1.

8. A method according to claim 7, comprising forming the devices such that in operation at least a portion of one of the devices is coupled to at least one waveguide.

9. A method according to claim 7, wherein the system comprises a plurality of waveguides that, in operation, are evanescently coupled.

10. A method according to claim 7, wherein the method comprises forming one of the devices to include a grating structure and to form another of the devices to include a further grating structure and/or a waveguide, and the devices are arranged so that in operation the grating structure is coupled to the further grating structure or the waveguide.

11. A method according to claim 7, comprising forming a grating coupler system.

12. A method according to claim 7, wherein the method comprises forming a plurality of cascaded grating coupler devices.

\* \* \* \* \*